United States Patent [19]
Akiyama

[11] Patent Number: 5,621,479
[45] Date of Patent: Apr. 15, 1997

[54] METHOD OF DRIVING A LIQUID CRYSTAL DISPLAY DEVICE

[75] Inventor: Takashi Akiyama, Saitama, Japan

[73] Assignee: Citizen Watch Co., Ltd., Tokyo, Japan

[21] Appl. No.: 545,574

[22] PCT Filed: Mar. 23, 1995

[86] PCT No.: PCT/JP95/00534

§ 371 Date: Nov. 17, 1995

§ 102(e) Date: Nov. 17, 1995

[87] PCT Pub. No.: WO95/26109

PCT Pub. Date: Sep. 28, 1995

[30]     Foreign Application Priority Data

Mar. 23, 1994  [JP]  Japan ................................ 6-051661

[51] Int. Cl.⁶ .................... H04N 9/68; H04N 9/30
[52] U.S. Cl. .................. 348/648; 348/791; 348/647
[58] Field of Search ........................... 348/791, 790, 348/645, 646, 647, 648, 643, 644, 649, 650, 655, 674, 675, 679; 345/88, 151; H04N 9/30, 9/68

[56]                References Cited

U.S. PATENT DOCUMENTS

| | | | |
|---|---|---|---|
| 4,633,299 | 12/1986 | Tanaka | 348/649 |
| 4,942,458 | 7/1990 | Miyajima et al. | 348/791 |
| 5,257,108 | 10/1993 | Muraoka | 348/674 |
| 5,404,165 | 4/1995 | Ohtsubo et al. | 348/674 |

FOREIGN PATENT DOCUMENTS

| | | |
|---|---|---|
| 58-164390 | 9/1983 | Japan. |
| 61-6994 | 1/1986 | Japan. |
| 3-62017 | 3/1991 | Japan. |

*Primary Examiner*—Michael Lee
*Attorney, Agent, or Firm*—Armstrong, Westerman, Hattori, McLeland & Naughton

[57]                ABSTRACT

A method of driving a liquid crystal display device for converting a composite video signal into RGB analog video signals by a chrominance circuit, and controlling the transmittance of each pixel corresponding to each color or red, green and blue on a liquid crystal panel based on the voltage levels of the RGB analog video signals so as to perform color display. The method includes the steps of detecting a color saturation of a picture based on the composite video signal, and controlling the transmittance of a liquid crystal panel based on the transmittance characteristic (T-V curve a) of each pixel relative to normal RGB analog video signals in the case that the color saturation is less than a predetermined value. Based on the transmittance characteristic (T-V curve b) of each pixel relative to RGB analog video signals at the voltage levels where the transmittance of each pixel of the liquid crystal panel reaches the maximum value are set to be less than normal values, in the case that the color saturation is higher than the predetermined value. As a result, color saturation of a display of the liquid crystal panel is more enhanced than the actual color saturation of the RGB analog video signals in a picture portion having high color saturation, thereby improving color reproducibility.

4 Claims, 9 Drawing Sheets

FIG.1

RGB ANALOG VIDEO SIGNAL VOLTAGE LEVEL

FIG.2

COMPOSITE VIDEO SIGNAL OF COLOR BAR

FIG. 17
(PRIOR ART)
COMPOSITE VIDEO SIGNAL

METHOD OF DRIVING A LIQUID CRYSTAL DISPLAY DEVICE

BACKGROUND OF THE INVENTION

1. Field of the Invention

The present invention relates to a method of driving a liquid crystal display device for performing color display, more particularly to a method of driving a liquid crystal display device for displaying information corresponding to a picture of a composite video signal in color.

2. Description of the Related Art

There has been widely used a liquid crystal display device capable of performing a color display as a display of various information from apparatuses and instruments such as a liquid crystal color TV, a personal computer, etc.

Figure 16:
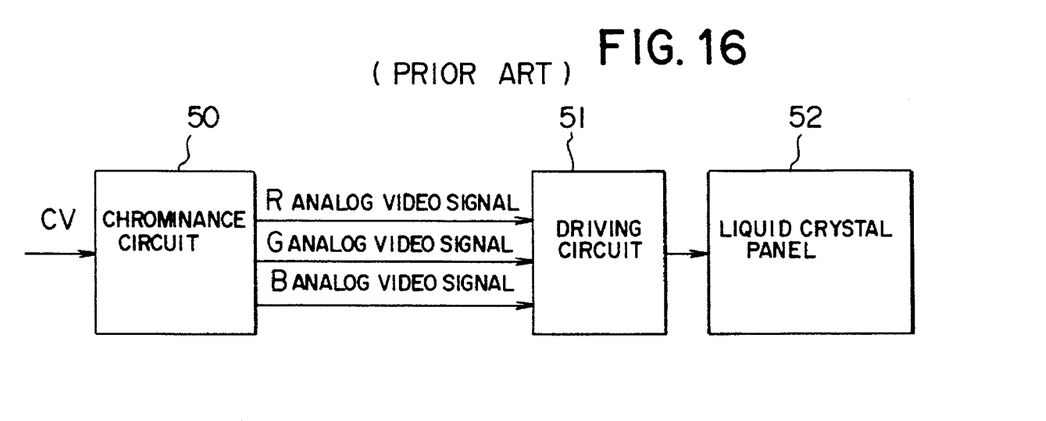
FIG. 16 is a block diagram of a prior art liquid crystal display device for explaining a prior art driving method.

A prior art basic driving method of such a liquid crystal display device will be explained with reference to FIG. 16.

A composite video signal CV is converted into RGB analog signals by a chrominance circuit 50 which are inputted to a driving circuit 51. The driving circuit 51 actuates a liquid crystal panel 52 based on the voltage levels of the RGB analog video signals to control the transmittance of each pixel corresponding to each color of red, green and blue on a liquid crystal panel so as to perform color display.

The composite video signal may be of the NTSC system, the PAL system or the SECAM system. The NTSC system will be described hereinafter.

Figure 17:
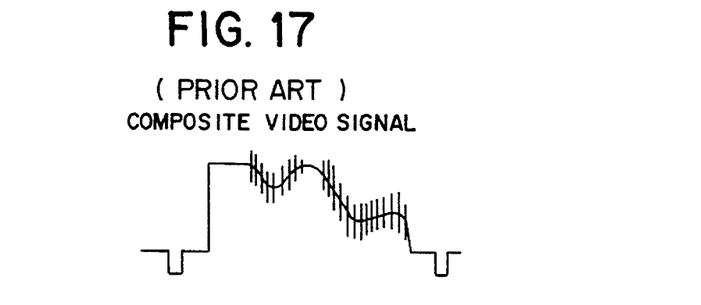
FIG. 17 is a waveform of a composite video signal to be inputted to a chrominance circuit 50 of FIG. 16.

FIG. 17 shows an example of a composite video signal. This signal is converted into RGB analog video signals having red, green and blue colors respectively by the chrominance circuit 50.

Figures 18A, 18B, 18C:
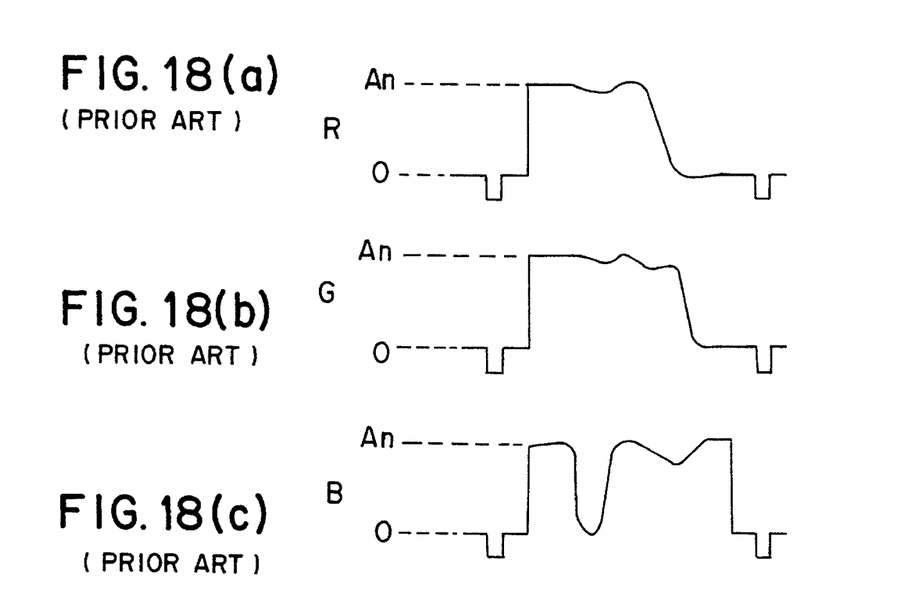
FIG. 18(a)–18(c) show waveforms of RGB analog video signals which are converted by the chrominance circuit 50 of FIG. 16.

FIG. 18(a)–18(c) show the converted RGB analog video signals. In the figure, denoted at An is the maximum amplitude of each of the RGB analog video signals.

The driving circuit 51 controls the transmittance of each pixel corresponding to each color of red, green and blue on a liquid crystal panel 52 in response to the voltage levels of the inputted RGB analog video signals to faithfully reproduce the image of the RGB analog video signals thereon.

Figure 19:
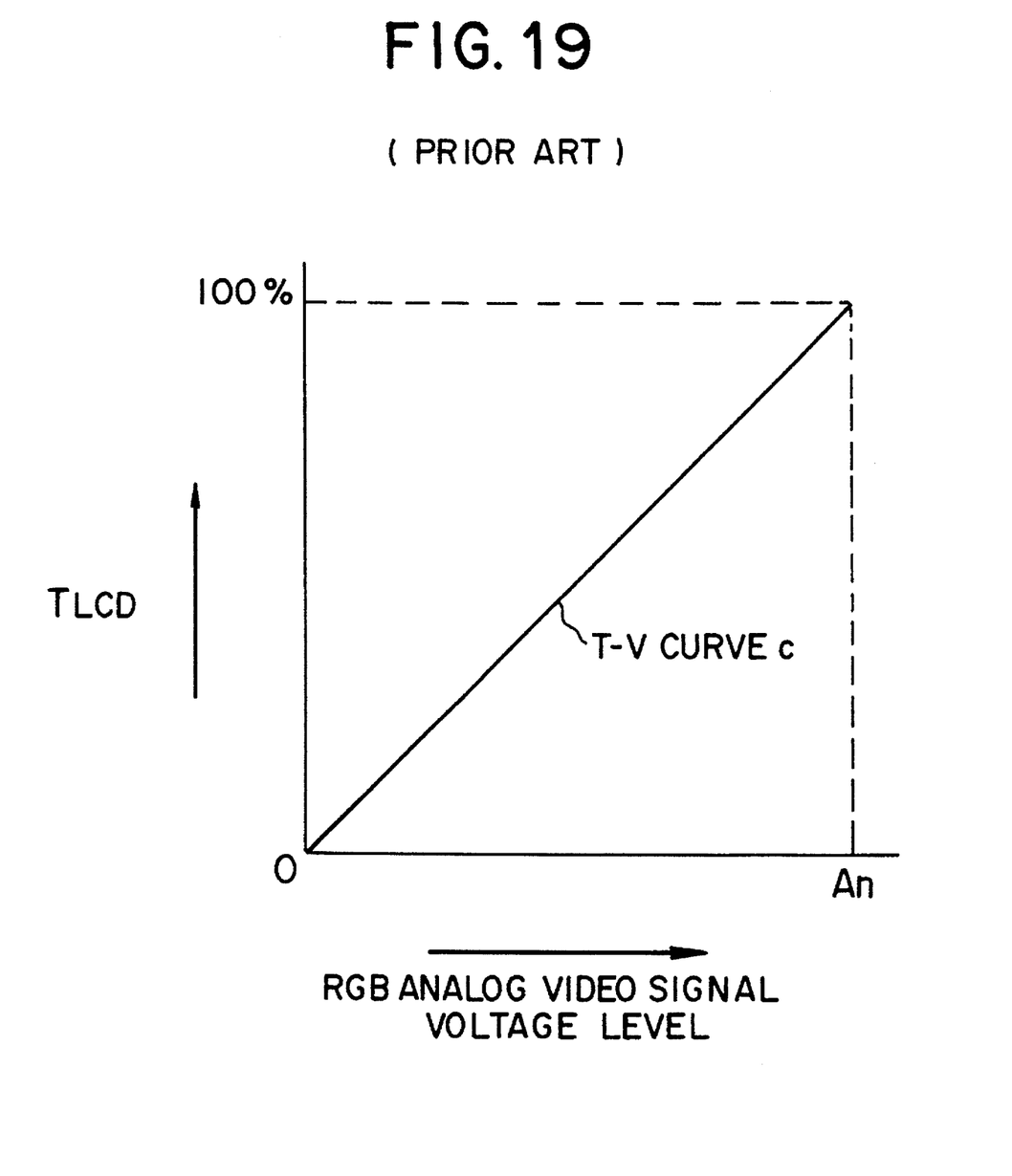
FIG. 19 is a characteristic curve showing the relationship between a prior art RGB analog video signal voltage level and the transmittance of a liquid crystal display device.

FIG. 19 shows the relationship between the RGB analog video signals and the transmittance of the liquid crystal panel. In the figure, the lateral axis represents the voltage levels of the RGB analog video signals while the vertical axis represents the transmittance TLCD of the liquid crystal panel. A T-V curve c represents the transmittance characteristic.

When the voltage level of the RGB analog video signal is as large as the maximum amplitude An, the transmittance of the liquid crystal panel becomes 100%, and when the voltage level thereof is 0, the transmittance also becomes 0%. A color picture is displayed based on the transmittance characteristic.

As mentioned above, in the prior art liquid crystal display device, there is only one transmittance characteristic as shown in FIG. 19 so that an image represented by a composite video signal is represented based on the same transmittance characteristic irrespective whether color or monochrome. Accordingly, the color reproducibility of a color picture displayed on the prior art liquid crystal display device is determined by the color demodulation performance of a chrominance circuit 50 in FIG. 16, and hence the demodulation performance of the chrominance circuit is regarded as important.

Whereupon, even if the chrominance circuit 50 having a high demodulation performance is employed, a picture actually displayed on the liquid crystal display device appears inferior to that displayed on a color CRT in color reproducibility. This is mainly caused by the NTSC broadcasting system. The NTSC system is conceived on the premise of employment of a CRT as an image receiver, and it skillfully employs many techniques utilizing characteristics of the CRT and of human visual processing and interpretation.

However, the CRT is different from the liquid crystal display device in a method of display. The NTSC system sometimes causes inconvenience in color reproducibility on the liquid crystal display device, which is different from the CRT in the method of display.

The CRT performs color display when an electronic gun emits an electronic beam to a fluorescent body to make the same emit light. Contrary to this, the liquid crystal display device is a light-receiving type display device of a light bulb system which controls the transmission of light emitted from a back light.

A cold-cathode tube is frequently employed as the back light, but a halogen lamp or a metal halide lamp is employed in a liquid crystal video projector and the like.

The light-receiving type liquid crystal display device employing the back light is short of brightness (luminance) compared with a light-emitting type CRT as matters stand. An opening ratio representing the ratio of area of the liquid crystal display device through which light is transmitted is about 30% in an active system. The 30% transmitted light is further absorbed by a deflecting plate and a color filter, and hence an actual amount of light transmitted therethrough is at most several percent of that emitted from the back light.

As mentioned above, the light utilization efficiency of the liquid crystal display device is inferior to that of the CRT so that a picture on the liquid crystal display device is much reduced in brightness compared with that on the CRT. Particularly, there is a problem of luminance shortage in the liquid crystal projector since a projection system is liable to be influenced by the brightness of the environment adding to insufficient brightness of the back light. Various inconveniences occur if the composite video signal of the NTSC system which premises the CRT for a display is displayed faithfully on such a liquid crystal panel which is inferior in brightness.

Firstly, in case of monochrome display having no color, the picture of the liquid crystal display device is less bright than that of the CRT but the former is reduced in brightness as a whole, a picture thereon can be seen sufficiently so long as it is bright to some extent. Moreover, in the case of the liquid crystal display device having the cold-cathode tube as the back light which has high color temperature, it gives a feeling close to that of the CRT.

Whereupon, a color display on the CRT is largely different from that of the liquid crystal display device in color reproducibility of the picture. If the same picture is displayed on the CRT and on the liquid crystal display device, the liquid crystal display device seems short in color saturation.

This is caused by the fact that for human beings color discrimination ability is reduced as luminance is lowered. Further, there occurs a Bezold-Bruecke phenomenon, that a color is recognized to be different in hue at a low luminance. Blue-green light seems to be more bluish and orange light seems to be more yellowish.

Such a phenomenon largely influences display quality. Since these are all caused by a shortage of luminance, such a phenomenon occurs remarkably in the projection type liquid crystal video projector rather than the liquid crystal display device which employs the cold-cathode tube as the back light. Particularly, in the case of a small 1-chip liquid crystal video projector employing a halogen lamp, it is remarkably short of luminance, which largely influences visual performance.

To cope with the aforementioned problem, there has been employed a method of enhancing color saturation using a chrominance circuit. This method is performed by separating a composite video signal CV into Y/C signal components in the chrominance circuit 50 as shown in FIG. 16, amplifying a C (color difference) signal component to increase the ratio of the C signal component relative to the Y (luminance) signal component thereby enhancing the color saturation.

Since most of the integrated-circuit chrominance circuits previously included therein a color adjusting circuit, this method could be relatively easily employed.

However, this method has a significant problem. That is, if the color adjustment is emphasized, a color noise is likely to occur due to cross-talk between color signals. Since the occurrence of the color noise remarkably deteriorates the display characteristic, there is a limit for enhancing the color saturation merely by the chrominance circuit.

The present invention solves the aforementioned problems and provides a liquid crystal display device capable of enhancing color saturation of a picture displayed in color on the liquid crystal display device to thereby improve the display quality without generating a color noise.

SUMMARY OF THE INVENTION

The present invention includes the following steps in a method of driving a liquid crystal display device for converting a composite video signal into RGB analog video signals by a chrominance circuit and controlling the transmittance of each pixel corresponding to each color of red, green and blue on a liquid crystal panel based on the voltage levels of the RGB analog video signals so as to perform a color display.

Color saturation of a picture is detected based on the composite video signal, and the transmittance of each pixel is controlled based on the transmittance characteristic of each pixel relative to the RGB analog video signals, wherein the RGB analog video signals are reduced in voltage levels at which the transmittance of each pixel of red, green, and blue on the liquid crystal panel reaches the maximum value as the detected color saturation is increased in magnitude.

In the above method, since a portion having low color saturation in the composite video signal makes the transmittance of the liquid crystal panel of the liquid crystal display device maximum at voltage levels near the peak voltages of the RGB analog video signals, but a portion having high color saturation makes the transmittance maximum at voltage levels lower than the peak voltages of the RGB analog video signals, the color saturation on the liquid crystal panel display can be enhanced compared with the actual color saturation of the RGB analog video signals. Further, since the color difference signal need not be amplified by the chrominance circuit, the color noise is not generated.

In a more concrete method, when the color saturation which is detected from the composite video signal is higher than a predetermined color saturation, the transmittance of each pixel may be controlled based on the transmittance characteristic of each pixel relative to the RGB analog video signals, wherein the transmittance of each pixel of red, green and blue on the liquid crystal panel reaches the maximum at about 75% of the voltage levels of the RGB analog video signals, which is lower than a predetermined color saturation at the time when the color saturation is less than the predetermined color saturation.

Further, in a method of a driving a liquid crystal display device for converting RGB analog video signals, which are converted from a composite video signal into digital signals, and controlling the transmittance of each pixel corresponding to each color of red, green and blue on a liquid crystal panel, based on the digital signals, so as to perform color display, the method includes reducing the upper side reference voltages of A/D converters for converting the RGB analog video signals into the digital signals as the color saturation detected from the composite video signal is increased in magnitude to make the converted digital signals large so that the color saturation on the liquid crystal panel display can be enhanced.

Further, in a method of driving a liquid crystal display device for converting RGB analog video signals, which are converted from a composite video signal, or digital signals, which are obtained by subjecting the RGB analog video signals to A/D conversion, into a pulse width signal for representing gradation by a pulse width modulation system, and controlling the transmittance of each pixel corresponding to each color of red, green and blue on the liquid crystal panel based on the pulse width so as to perform color display, the gradation steps are further shifted to a high luminance side as the color saturation detected from the composite video signal is increased in magnitude at the time of converting the RGB analog video signals, or the digital signals, which are obtained by subjecting the RGB analog video signals to the A/D conversion, into a pulse width signal, so as to enhance the luminance of the color picture on the liquid crystal panel and enhance the color saturation.

BRIEF DESCRIPTION OF THE DRAWINGS

FIG. 11(a)–11(d) show a waveform of a color detecting signal and waveforms of the RGB analog video signals respectively of the rising-sun flag picture in FIG. 9;

FIG. 12(a)–12(c) show views showing a transmittance (luminance) characteristic of the liquid crystal panel relative to the RGB analog video signals of the rising-sun flag picture in FIG. 9;

BEST MODE FOR CARRYING OUT THE INVENTION

An embodiment of the present invention will be described with reference to the attached drawings for explaining the content of the present invention in detail.

Figure 1:
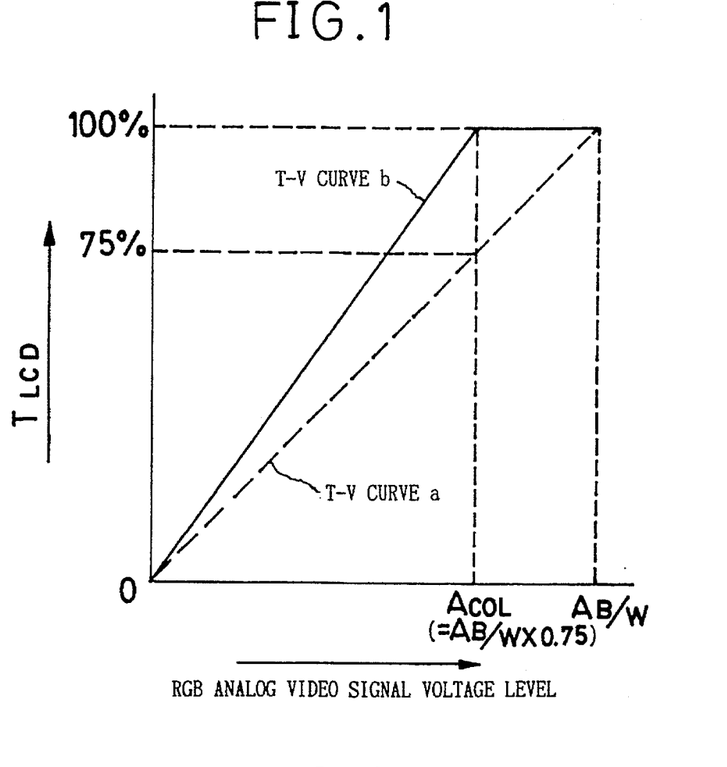
FIG. 1 is a graph showing a characteristic curve showing the relationship between an RGB analog video signal voltage level and a transmittance of a liquid crystal panel according to the embodiment of present invention.

FIG. 1 is a graph showing a characteristic curve showing the relationship between an RGB analog video signal voltage level and a transmittance of a liquid crystal panel utilized in the embodiment of the present invention.

The vertical axis of the graph represents transmittance of a liquid crystal panel (corresponding to luminance on the liquid crystal display) TLCD. That is, a screen or picture on the liquid crystal panel becomes the darkest which can be displayed on the liquid crystal panel in the case that the TLCD=0%, and the picture becomes the brightest which can be displayed on the liquid crystal panel in the case that the TLCD=100%. The lateral axis of the graph represents voltage levels of RGB analog video signals which are obtained by demodulating a composite video signal by a chrominance circuit, wherein AB/W represents a voltage level in the case of 100% amplitude and ACOL represents a voltage level in the case of 75% amplitude. The ACOL can be set to a voltage level other than the voltage level of 75% amplitude if it satisfies the relationship expressed by ACOL<AB/W.

A T-V curve a as shown in a broken line represents a characteristic establishing an equation of TLCD=0% when the RGB analog video signals are 0 V, and establishing an equation of TLCD=100% at the AB/W.

A T-V curve b as shown in a solid line represents a characteristic establishing the equation of TLCD=0% when the RGB analog video signals are 0 V, and establishing the equation of TLCD=100% at the ACOL, and saturating at a voltage level exceeding the ACOL.

That is, in the case of displaying a picture based on the characteristic of the T-V curve a, the TLCD varies in the range from 0% to 100% until the voltage level of AB/W, while in case of the characteristic of the T-V curve b, the TLCD becomes 100% at the ACOL voltage level corresponding to 75% of the AB/W, which reveals that the transmittance TLCD of the liquid crystal panel represented by the characteristic of the T-V curve b is higher than that represented by the characteristic of the T-V curve a at a voltage level other than the 0 V and at AB/W, which assures bright (high luminance) display. It is possible to enhance the color saturation displayed on the liquid crystal panel and improve the color reproducibility by properly using these two T-V curves depending on color saturation.

A method of properly using the T-V curve a and the T-V curve b will be now described with reference to a case for displaying a signal having a 75% color bar (hereinafter referred to as a 75% color bar signal).

Figure 2:
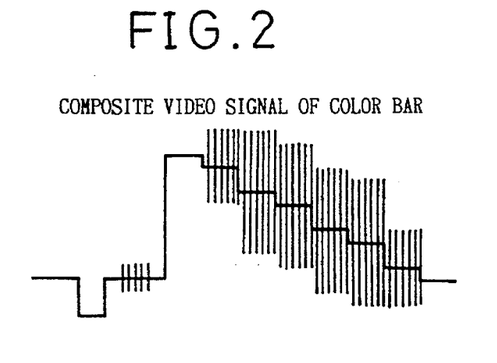
FIG. 2 is a waveform of a composite video signal having a 75% color bar employed by an embodiment of the present invention.
Figure 4A:
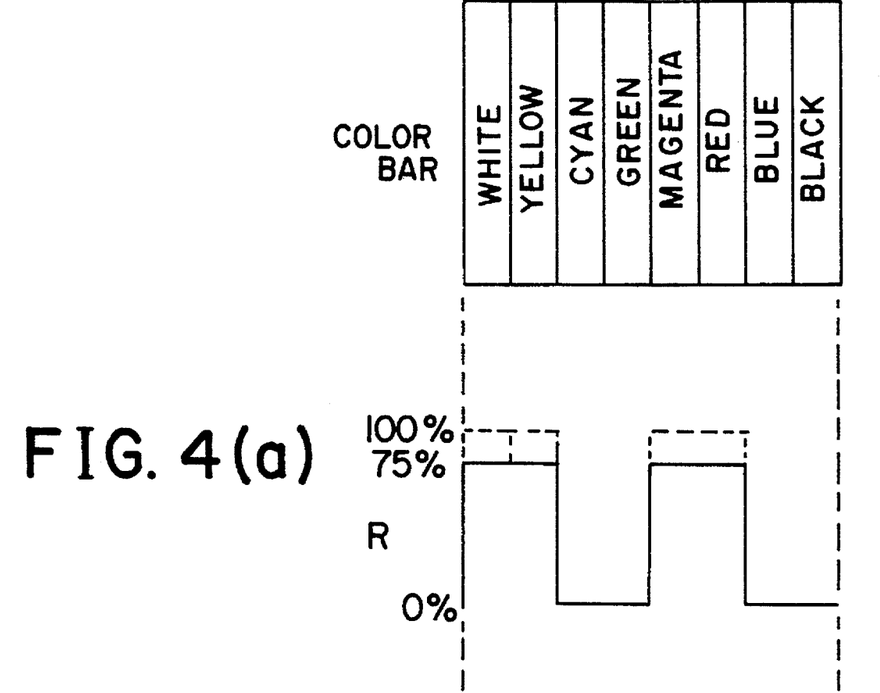
FIG. 4(a)–4(c) are showing a picture having a 75% color bar displayed on the liquid crystal display device, and a luminance characteristic of each color of the RGB analog video signals displayed on the liquid crystal display device.

FIG. 2 shows a composite video signal consisting of a 75% color bar signal. The thick line represents a luminance signal and vertical thin lines represent color difference signals overlaid on the luminance signal. A portion having no color difference signal at the left end of the 75% color bar signal is white having 75% luminance, which is successively followed to the right by yellow, cyan, green, magenta, red, blue respectively having a 75% color saturation, and the right end is black having 0% luminance. A state where the 75% color bar is actually displayed on the liquid crystal panel is shown at the uppermost of FIG. 4.

Figure 4B:
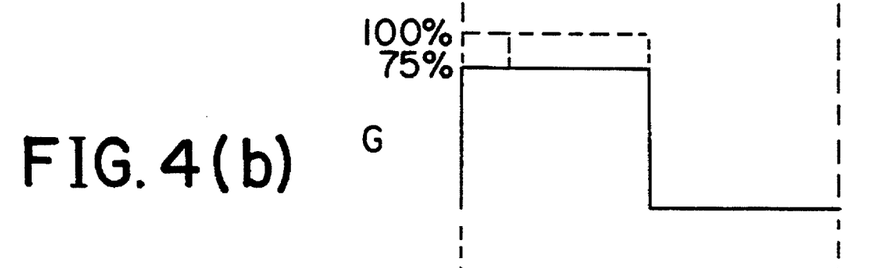
Figure 4C:
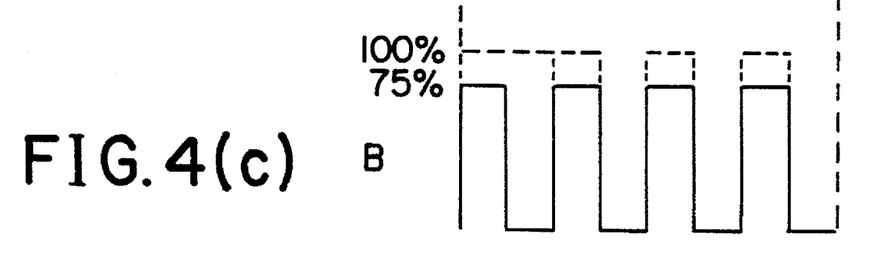

Described hereinafter is a case of display of the 75% color bar using the liquid crystal display device having the characteristic of the T-V curve a in FIG. 1. A solid line in the graph of FIG. 4 represents the luminance (transmittance) characteristic of each primary color of the RGB when the 75% color bar is displayed.

A portion having 75% white has 75% luminance in each of the RGB signals while a portion having 0% black has 0% luminance in each of the RGB signals. Other colors are produced by the additive color mixing principle, but every color can be produced by a combination of 75% luminance and 0% luminance, and has 75% color saturation.

A prior art liquid crystal display device corresponds to this case, wherein since both monochrome and color portions employ the T-V curve a, they reach up to 75% luminance so that they still keep 75% color saturation.

Whereupon, the composite video signal is transmitted with the color difference signal being overlaid on the luminance signal. The amplitude of the color difference signal is taken out from color information included in the color difference signal as color saturation information. Supposing that the amplitude of the color difference signal is simply treated as the color saturation information, some problems strictly occur.

However, since this does not substantially cause any problem in the visual property of human beings, the amplitude of the color difference signal may be treated as the color saturation information.

Figure 3:
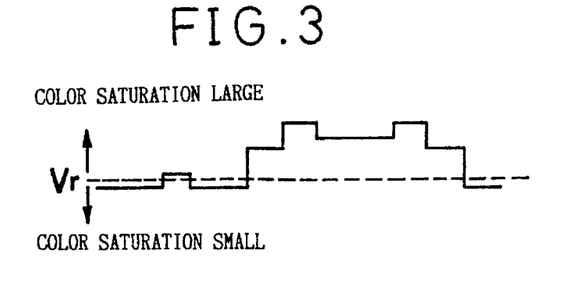
FIG. 3 is a view showing an envelope of amplitude of a color difference signal component in an embodiment of the present invention.

FIG. 3 shows a waveform of a color detection signal serving as the envelope of the amplitude of the color difference signal component having the 75% color bar shown in FIG. 2. In FIG. 3, a portion having the maximum amplitude represents a portion having the highest color saturation, and the monochrome portion represents a portion having the minimum amplitude.

A method of detecting the color detection signal of FIG. 3 from the composite video signal of FIG. 2 will be now described with reference to FIG. 5.

A composite video signal CV is inputted to a Y/C separator 1 and the component of the color difference signal C which is separated by the Y/C separator 1 is inputted to a color detector 2, and an envelope of the color difference signal C is outputted as a color detection signal Sc. There are various systems known as the Y/C separator 1, such as a band pass filter system in a color sub-carrier band, a one line comb-type filter system, a three-dimensional YC separation system, etc., any of which may be employed by the Y/C separator 1. The color detector 2 is composed of a rectifier circuit and a low-pass filter and produces an envelope signal of the color difference signal C, which is amplified and outputted as the color detection signal Sc.

Figure 6:
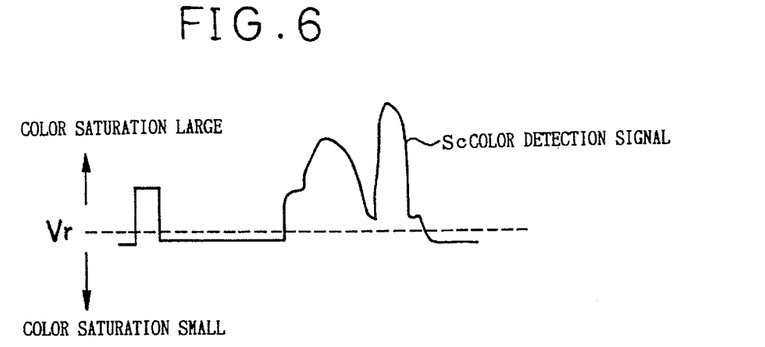
FIG. 6 is a view showing the relationship between a waveform of a color detection signal and color saturation in FIG. 5.

FIG. 6 is an enlarged waveform of the color detection signal Sc. A broken line represents a level of a threshold voltage Vr for determining the color saturation. A portion which is higher than the level of the threshold voltage Vr is judged to have high color saturation and a portion which is lower than the level of the threshold voltage Vr is judged to have low color saturation. It is the same in the case of the color detecting signal of the 75% color bar shown in FIG. 3, wherein a broken line is judged to represent high color saturation at the portion thereof higher than the threshold voltage Vr, and is judged to represent low color saturation at the portion lower than that.

In the case of the 75% color bar, all the color portions have relatively high, i.e. 75% color saturation, and both ends thereof, i.e. 75% white and 0% black portions alone, have low color saturation, which results in that all the color portions have high color saturation.

The T-V curve a and the T-V curve b representing two transmittance characteristics as shown in FIG. 1 are properly used depending on high or low color saturation so as to control the transmittance of the liquid crystal panel, thereby performing the color display. That is, the portion having low color saturation under the threshold voltage Vr shown in FIG. 3 in the color detection signal of the 75% color bar is displayed in accordance with the characteristic of the T—V curve a in FIG. 1, while the portion having high color saturation above the threshold voltage Vr is displayed in accordance with the characteristic of the T-V curve b.

As a result, the 75% white portion at the left side follows the characteristic of the T-V curve a, and hence the voltage level corresponds to the ACOL which is 75% of the AB/W in FIG. 1, so that it is displayed to meet the equation TLCD=75%. On the other hand, the portion which has high color saturation from yellow to blue follows the characteristic of the T-V curve b, so that the 75% luminance level thereof satisfies the equation TLCD=100% in the ACOL voltage level in FIG. 1. The luminance (transmittance) characteristic displayed on the liquid crystal panel at this time is shown in FIG. 4 by broken lines.

In FIG. 4(a)–4(c), the monochrome portion of the 75% white and 0% black is displayed in the conventional manner but the colored portion which has high color saturation from yellow to blue is improved in the luminance of each color of the RGB by 25%, namely, from 75% to 100%. A portion having 0% luminance of each color of the RGB is still 0%. Accordingly, the color saturation displayed on the liquid crystal panel is enhanced.

Although the case of display of the 75% color bar has been explained above as shown in FIG. 1, since the voltage levels of the RGB analog video signals in the T-V curve b are higher in transmittance TLCD than that in the T-V curve a in a voltage level other than the 75% voltage level, the color saturation displayed on the liquid crystal panel can be enhanced.

In FIG. 1, the TLCD is saturated, i.e., becomes 100% at a voltage level which is greater than the ACOL in the T-V curve b, which generates the problem of color reproducibility. However, as there is scarcely any information having more than 75% color saturation in a picture signal such as an actually televised picture signal, there does not actually occur any problem in visual processing and interpretation.

If the color saturation is to be further enhanced, the voltage level ACOL at which the T-V curve b in FIG. 1 is saturated to 100% may be lowered to a voltage level still lower than 75% of the AB/W. According to an experiment made by the inventor, he felt that the color saturation was too high if the ACOL is lowered to 60%, being most appropriate at about 75%.

Figure 7:
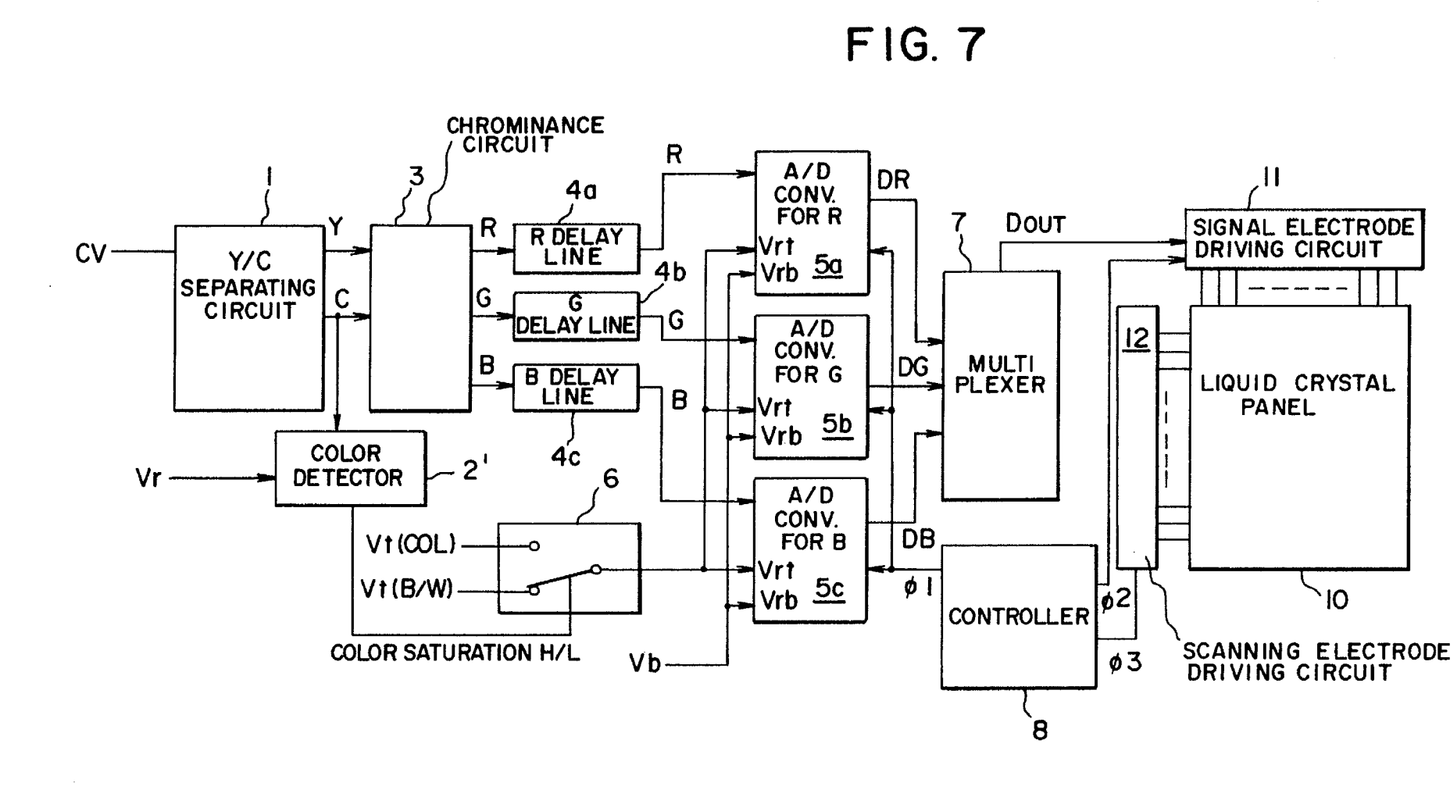
FIG. 7 is a block diagram showing an example of a liquid crystal display device employing a driving method of the present invention.

An example of the liquid crystal display device for realizing the preferred embodiment as mentioned above will be now described. FIG. 7 is a block diagram showing an arrangement of the liquid crystal display device.

Figure 5:
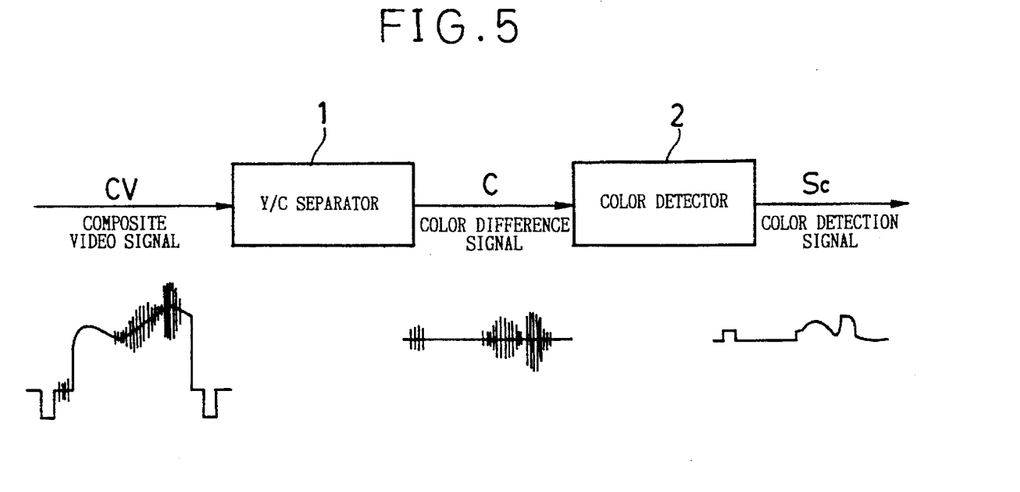
FIG. 5 is a block diagram of a color detecting means according to the embodiment of the present invention.

The composite video signal CV is inputted to the Y/C separator 1 in the same manner as illustrated in FIG. 5. A luminance signal Y and a color difference signal C that have been separated from each other by the Y/C separator 1 are inputted to a chrominance circuit 3 and the color difference signal C is also inputted to a color detector 2'. Each analog video signal of the RGB signals which are demodulated by the chrominance circuit 3 is inputted to an R A/D converter 5a, a G A/D converter 5b or a B A/D converter 5c, by way of an R delay line 4a, a G delay line 4b or a B delay line 4c, respectively.

The color detector 2' forms an envelope of the color difference signal C separated by the Y/C separator 1 to obtain a color detection signal, and compares the color detection signal with the threshold voltage Vr so as to judge high or low color saturation and it converts the high or low color saturation into an H or L binary signal which is outputted therefrom.

A multiplexer 6 outputs the voltage Vt (COL) in case of high color saturation (detection signal is H), or the voltage Vt (B/W) in case of low color saturation (detection signal is L) depending if the color saturation output from color detector 2' is H or L, as the upper side reference voltage Vrt of each of the A/D converters 5a to 5c. A constant voltage Vb is applied to each of the A/D converters 5a to 5c as the lower side reference voltage Vrb thereof.

The A/D converters 5a to 5c convert the RGB analog signals into digital signals DR, DG, DB which are output as an output Dout through a multiplexer 7 and the output Dout is inputted to a signal electrode driving circuit 11.

A controller 8 outputs a clock φ1 to each of the A/D converters 5a to 5c, a signal electrode driving clock φ2 to the signal electrode driving circuit 11 and a scanning clock φ3 to a scanning electrode driving circuit 12. The transmittance of each pixel corresponding to each color of red, green or blue of the liquid crystal panel is controlled by the signal electrode driving circuit 11 and the scanning electrode driving circuit 12, so as to display a color picture on the liquid crystal panel 10.

Figure 8:
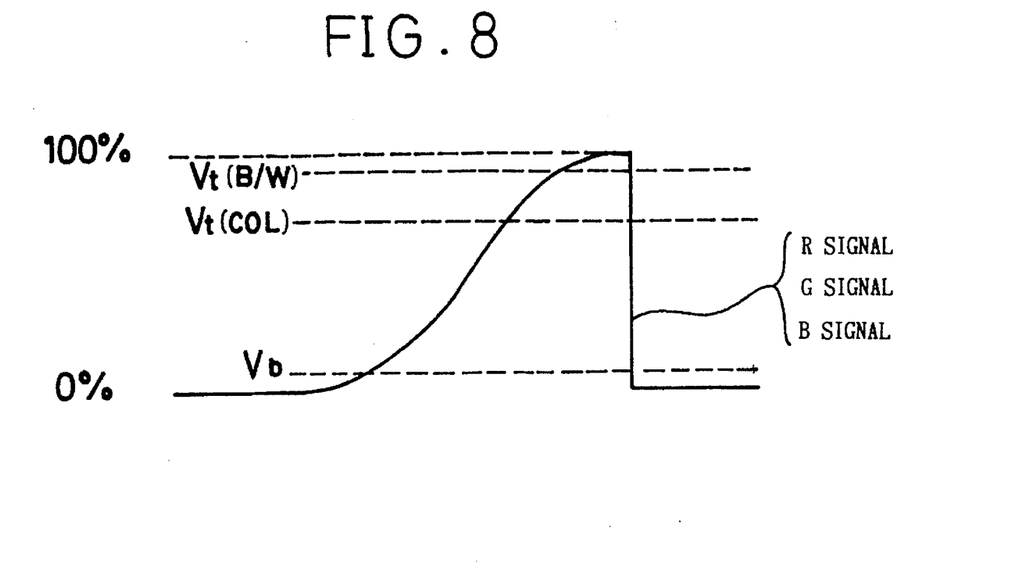
FIG. 8 is a waveform showing the maximum amplitudes of the RGB analog video signals.

Setting voltage levels of two upper side reference voltages Vt (COL) and Vt (B/W) and a lower side reference voltage Vb to be selected by the multiplexer 6 are shown in FIG. 8. In FIG. 8, a waveform as shown in a solid line is a ramp waveform extending from 0% black to 100% white of the analog video signals RGB (R signal, G signal and B signal) to be inputted to the R A/D converter 5a, G A/D converter 5b or B A/D converter 5c in FIG. 7 respectively.

The Vt (B/W) is the upper side reference voltage to be used in the case of low color saturation and is set to a value which is slightly less than 100% white. Vt (COL) is the upper side reference voltage to be used in the case of high color saturation and is set to a value near 75% white. The lower side reference voltage Vb is set to a value slightly greater than 0% black.

Each delay time on the R delay line 4a, G delay line 4b and B delay line 4c shown in FIG. 7 is set to a time from the detection of the high or low color saturation from the color difference signal C by the color detector 2' until the operation of the multiplexer 6 to output the upper side reference voltages Vt (B/W) or Vt (COL) to the R A/D converter 5a, G A/D converter 5b and B A/D converter 5c.

A detailed example according to the embodiment of the present invention will be now described with reference to the rising-sun flag picture.

Figure 9:
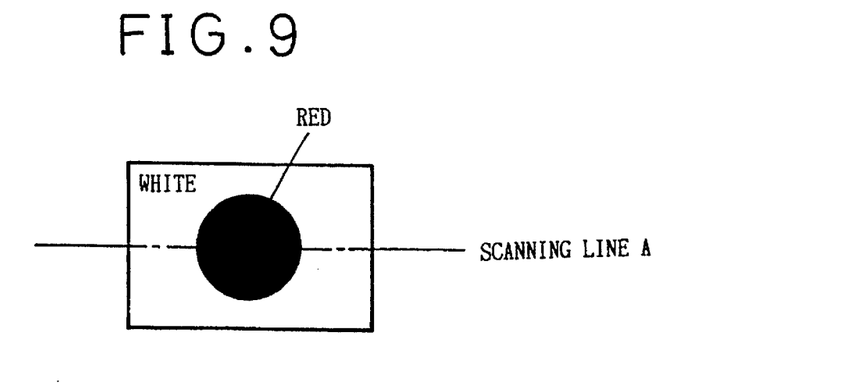
FIG. 9 is a view showing the rising-sun flag picture displayed on the liquid crystal panel for explaining the driving method of the liquid crystal display device according to the present invention.

FIG. 9 is a view showing the rising-sun flag picture displayed on the liquid crystal panel.

Figure 10:
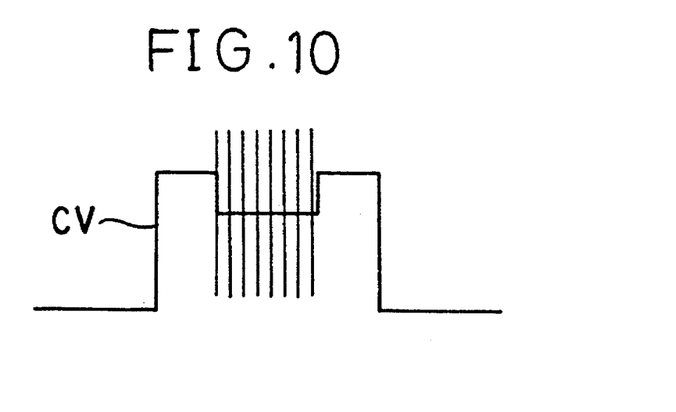
FIG. 10 is a waveform of a picture signal of the rising-sun flag picture in FIG. 9.

The composite video signal CV of a scanning line A of this picture is shown in FIG. 10 wherein the color difference signals are overlaid with one another in a portion corresponding to a central red circle.

Figure 11A:
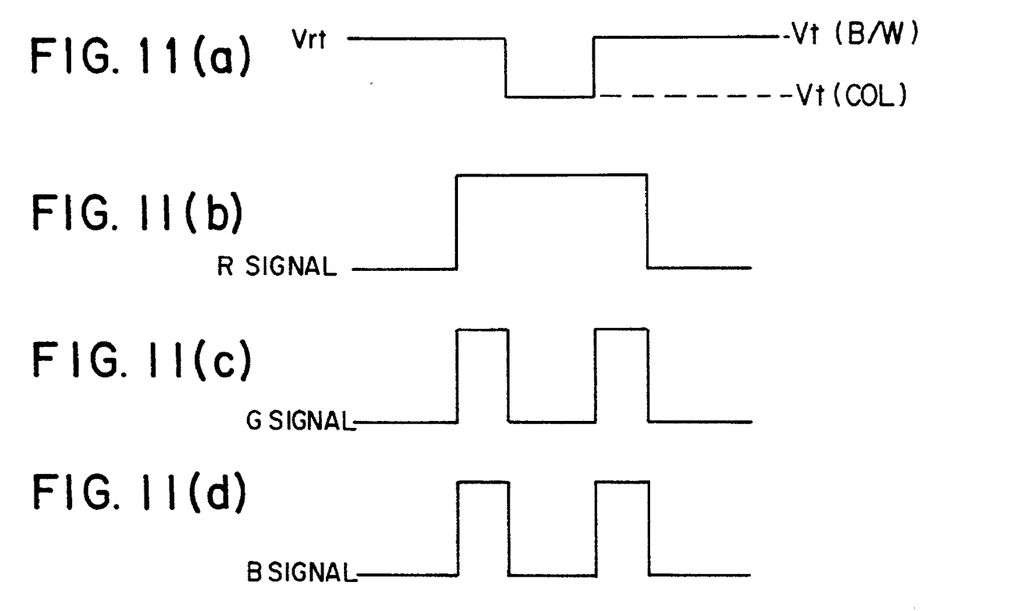

FIG. 11a is a waveform of an upper side reference voltage Vrt to be inputted to the R A/D converter 5a, G A/D converter 5b and B A/D converter 5c. This upper side reference voltage Vrt is set to the voltage level of the Vt (COL) in the red portion in FIG. 9 and is set to the voltage level of the Vt (B/W) in the portion other than the red portion. The lower side reference voltage Vrb is always set to the voltage level of the Vb.

FIGS. 11(b)–11(d) also show waveforms of the R signal, G signal and B respectively which are converted into digital signals DR, DG and DB by the A/D converters 5a to 5c in response to the upper and lower side reference voltages in synchronization with the clock φ1.

The digital signal DR among these digital signals DR, DG and DB is made to have a large value of digital data, i.e., that having high luminance information only in the red portion which is to be subjected to an A/D conversion when the upper side reference voltage Vrt is the upper side reference voltage Vt (COL).

These converted digital signals DR, DG and DB are selected by a multiplexer 7 in accordance with the disposition of the color filters of the liquid crystal panel 10, and are transferred to a signal electrode driving circuit 11 in synchronization with a signal electrode driving clock φ2 so that voltages corresponding to digital values of these digital signals are applied to the liquid crystal panel 10.

Figure 12A:
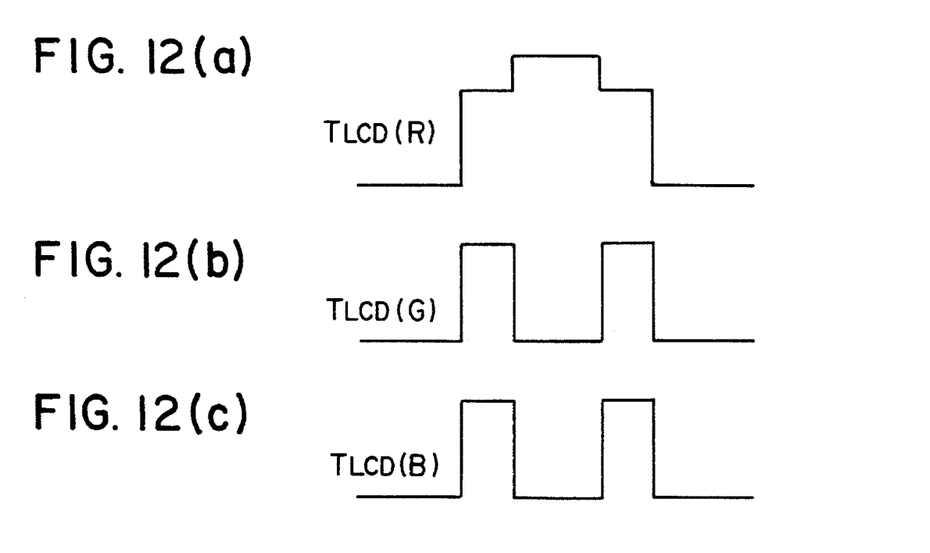

FIGS. 12(a)–12(c) represent the transmittance (luminance) characteristic TLCD of each color of the RGB on the scanning line A of the picture displayed on the liquid crystal panel 10 at that time. It is recognized from FIG. 12a that the transmittance, i.e., luminance of R (TLCD (R)) alone is increased only in the red portion. The transmittance of G and B of the red portion of the rising-sun flag does not vary while remaining 0% black since the upper side reference voltage Vrt is fixed to Vt (B/W) so that the color saturation of the red portion alone of the rising-sun flag is made high.

In the case of the liquid crystal display device for converting the RGB analog video signals into the digital signals by the A/D converters so as to be displayed on the liquid crystal panel, the color saturation on the display can be enhanced and color reproducibility can be improved relatively easily merely by varying the upper side reference voltage of the A/D converter based on the color saturation.

Further, although there is a liquid crystal display device for displaying gradation by pulse width modulation, the color saturation of the display device can be enhanced by adding a simple circuit to such a device.

Figure 13:
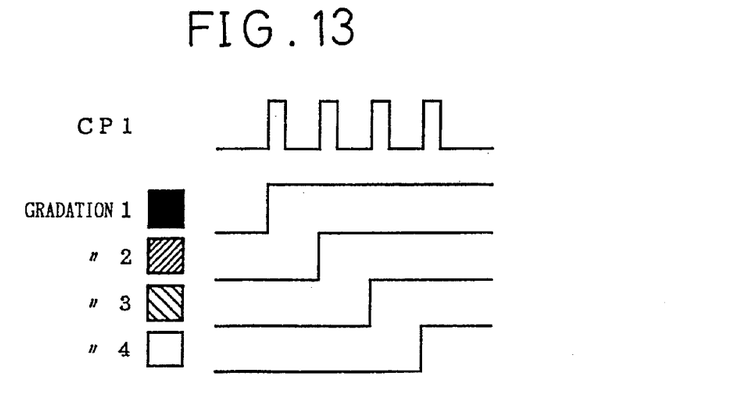
FIG. 13 is a view showing a pulse width modulation waveform and examples of gradation display in a low color saturation portion in a case of performing the gradation display based on a pulse width modulation system in an embodiment of the present invention.
Figure 14:
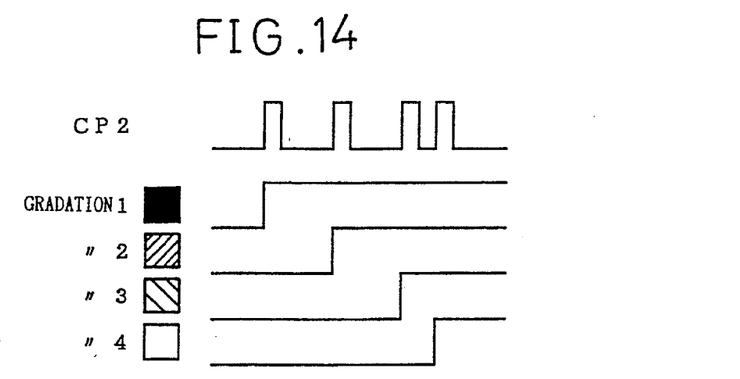
FIG. 14 shows views showing a pulse width modulation waveforms and examples of gradation display in a high color saturation portion also in an embodiment of the present invention.

Pulse width modulation waveforms and gradation displays in the case of four-gradation display are shown in FIGS. 13 and 14.

FIG. 13 shows waveforms of the gradation display at low color saturation. Denoted at CP1 is a waveform to determine the step of each gradation wherein the rise of each pulse waveform corresponds to each gradation. When the gradation display is performed by CP1, voltages to be applied to a signal electrode are shown thereunder and the luminance of the gradation is shown at left side of each waveform in each case.

FIG. 14 shows waveforms of the gradation display at a high color saturation portion. Denoted at CP2 is a waveform to determine the step of each gradation portion. The second and succeeding steps of gradation of CP2 are set to be shifted toward a high luminance compared with CP1.

The two kinds of gradations can be selected in response to the color saturation. The gradation display in FIG. 13 is performed when the color saturation is low, and the gradation display in FIG. 14 is performed when the color saturation is high.

Figure 15:
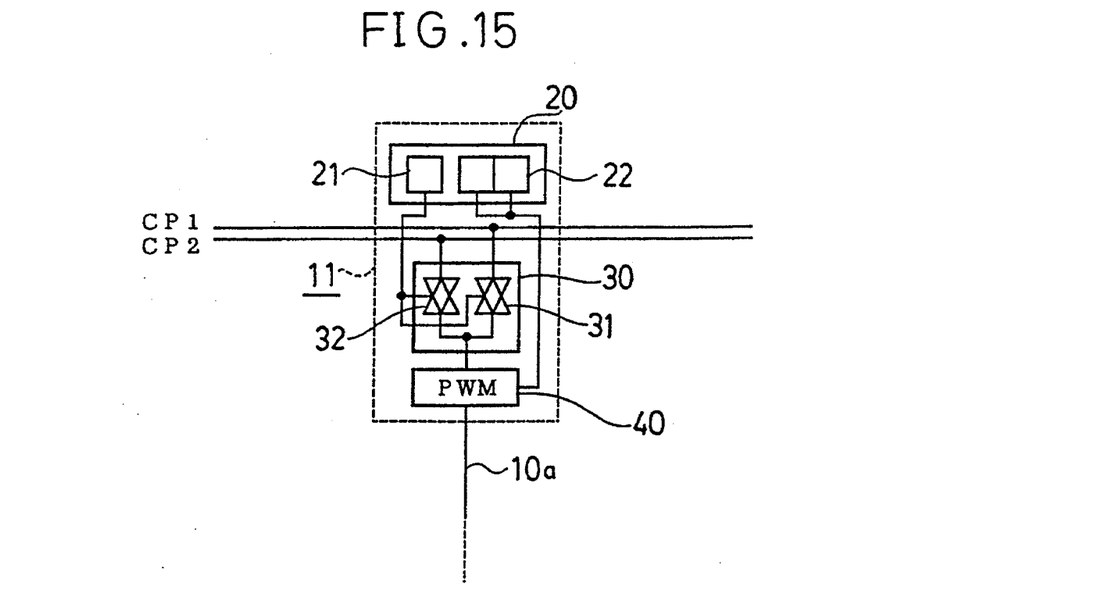
FIG. 15 is a block diagram showing an example of an arrangement of a signal electrode driving circuit employed by the embodiment of the present invention.

FIG. 15 shows a block of the signal electrode driving circuit 11 employed by this embodiment. A memory 20 is composed of a 1-bit memory 21 for color detection and a memory 22 for data. The memory 22 for data, the memory 21 for color detection, the waveform CP1 and the waveform CP2 are connected to a pulse width modulator 40, a switching device 30, a switching circuit 31 of the switching device 30 and another switching circuit 32, respectively.

The switching device 30 switches a pair of switching circuits 31 and 32 to supply the waveform CP2 in the case of a high color saturation or the waveform CP1 in the case of a low color saturation to the pulse width modulator 40, respectively based on the output of the memory 21 for color detection.

The pulse width modulator 40 converts the digital signals DR, DG and DB supplied from the memory 22 for data into pulse width signals having various gradations in synchronism with the waveform CP1 or CP2 supplied from the switching device 30 to supply the converted pulse width signals to the signal electrode 10a of the liquid crystal panel 10 shown in FIG. 7. The gradation display can be realized by providing as many blocks of the signal electrode driving circuit 11 as there are signal electrodes of the liquid crystal panel 10.

With the arrangement set forth above, it is possible to enhance the displayed color saturation by changing the gradation steps using the pulse width modulation system depending on the height of the color saturation (the gradation steps are shifted to the high luminance side when the color saturation is high).

On the other hand, some active driving systems using a TFT employ a pulse height modulation system in which the analog video signal is amplified as it is to be applied to the liquid crystal panel 10 as a signal electrode driving signal. With these active driving systems, it is evident from the same viewpoint that it is possible to enhance the displayed color saturation by changing an amplification factor or a clamping voltage.

Although this embodiment employs a two-value expression wherein the color saturation is either high or low, it is not limited to the two-value expression, but a multi-value expression of more than two can better improve the awkwardness at the switching portion.

Moreover, in all the cases described above, it is possible to realize display without generation of color noise to keep balance in displaying white so long as the color adjustment of the chrominance circuit 3 as shown in FIG. 7 is usually set to a proper value.

As described above, the method of driving a liquid crystal display device according to the present invention can enhance display quality by increasing the color saturation of color display on a liquid crystal display device and dispense with a chrominance circuit for amplifying a color difference signal, so that it is free from the generation of color noise.

As a result, it is very effectively adapted to a method of driving a liquid crystal display device in various information devices such as a liquid crystal color TV or a personal computer equipped with a liquid crystal color display.

I claim:

1. A method of driving a liquid crystal display device for converting a composite video signal into RGB analog video signals by a chrominance circuit, and controlling a transmittance of each pixel corresponding to each color of red, green and blue on a liquid crystal panel based on voltage levels of said RGB analog video signals so as to perform color display, the method comprising the steps of:

detecting a color saturation of a picture based on said composite video signal; and controlling the transmittance of each pixel based on a transmittance characteristic of each pixel relative to said RGB analog video signals, wherein said RGB analog video signals are reduced in voltage levels at which the transmittance of each pixel of red, green and blue on said liquid crystal panel reaches a maximum value as the detected color saturation is increased above a predetermined threshold level.

2. A method of driving a liquid crystal display device for converting a composite video signal into RGB analog video signals by a chrominance circuit, and controlling a transmittance of each pixel corresponding to each color of red, green and blue on a liquid crystal panel based on voltage levels of said RGB analog video signals so as to perform color display, the method comprising the steps of:

detecting a color saturation of a picture based on said composite video signal; and when said detected color saturation is greater than a predetermined threshold level, controlling the transmittance of each pixel based on a transmittance characteristic of each pixel relative to said RGB analog video signals, wherein the transmittance of each pixel of red, green and blue on said liquid crystal panel reaches the maximum value at about 75% of a voltage level of the RGB analog video signals at a time when the color saturation is less than the predetermined color saturation.

3. A method of driving a liquid crystal display device for converting a composite video signal into RGB analog video signals by a chrominance circuit, and further converting said RGB analog video signals into digital signals and controlling a transmittance of each pixel corresponding to each color of red, green and blue on a liquid crystal panel based on said digital signals so as to perform color display, the method comprising the steps of:

detecting color saturation of a picture based on said composite video signal; and reducing upper side reference voltages of A/D converters for converting said analog video signals into said digital signals as said detected color saturation is increased in magnitude above a predetermined threshold level.

4. A method of driving a liquid crystal display device for converting a composite video signal into RGB analog video signals by a chrominance circuit and further converting said RGB analog signals into digital signals by subjecting the RGB analog video signals to A/D conversion, which are further converted into a pulse width signal for representing gradations by a pulse width modulation system and controlling a transmittance of each pixel corresponding to each color of red, green and blue on the liquid crystal panel based on the pulse width so as to perform color display, the method comprising the steps of:

detecting color saturation of a picture based on said composite video signal; and shifting gradation steps further to a high luminance side at a time of converting the RGB analog video signals, or the digital signals which are obtained by subjecting the RGB analog video signals to the A/D conversion, into a pulse width signal, as said detected color saturation is increased in magnitude above a predetermined threshold level.

* * * * *

UNITED STATES PATENT AND TRADEMARK OFFICE
CERTIFICATE OF CORRECTION

PATENT NO.:    5,621,479
DATED      :-  April 15, 1997
INVENTOR(S):   Takashi Akiyama It is certified that error appears in the above-identified patent and that said Letters Patent is hereby corrected as shown below:

At column 11, line 43, delete "convening" and insert therefor --converting--.

Signed and Sealed this

Twenty-sixth Day of August, 1997

Attest:

BRUCE LEHMAN

Attesting Officer    Commissioner of Patents and Trademarks